(No Model.) 3 Sheets—Sheet 1.
W. H. KNIGHT.
ELECTRIC RAILWAY.
No. 338,175. Patented Mar. 16, 1886.
FIG. I.
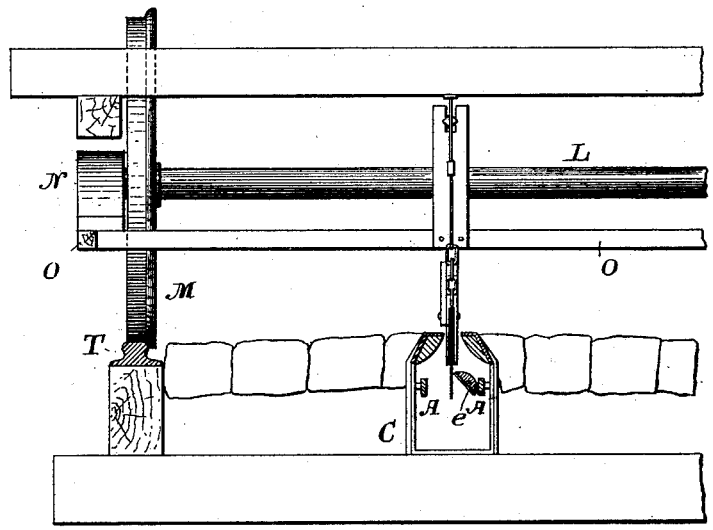
FIG. I<sup>a</sup>.
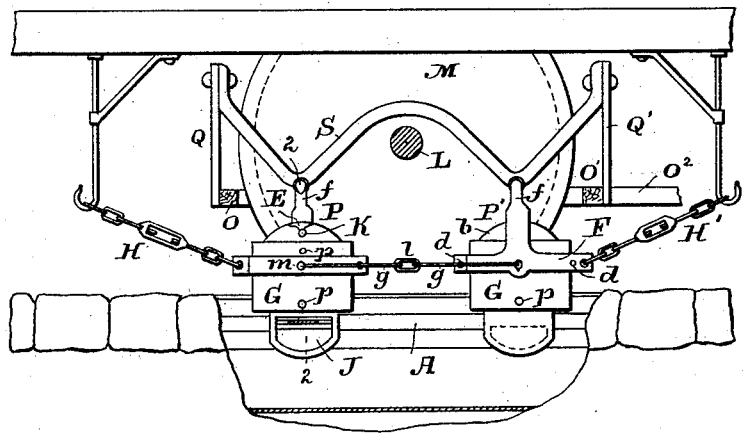
ATTEST.
J. Henry Kaiser
Harry L. Ames.
INVENTOR.
W. H. Knight
by Bentley Knight
attys.

(No Model.)  3 Sheets—Sheet 2.
W. H. KNIGHT.
ELECTRIC RAILWAY.
No. 338,175. Patented Mar. 16, 1886.
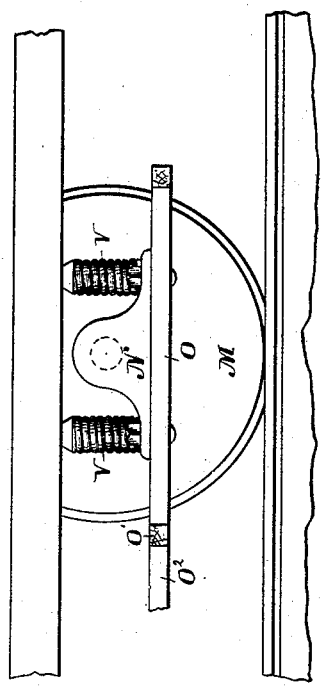
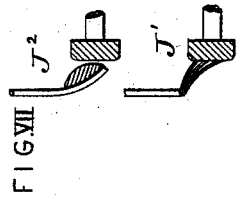
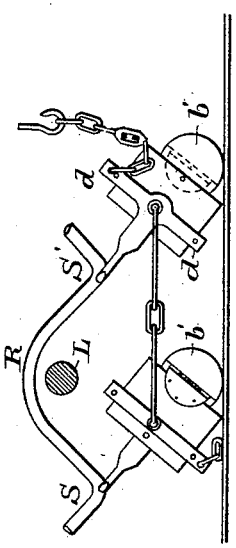
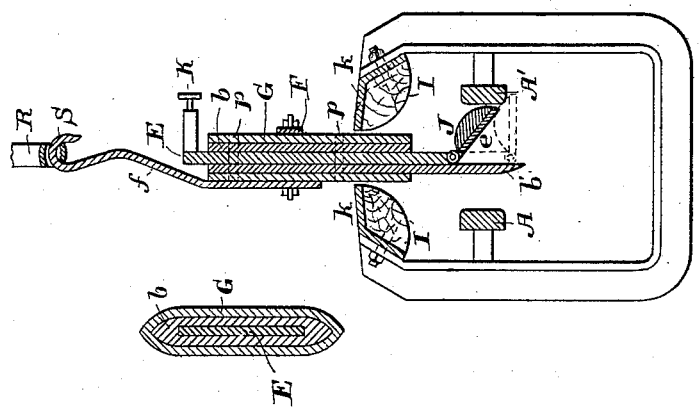

(No Model.) 3 Sheets—Sheet 3.
W. H. KNIGHT.
ELECTRIC RAILWAY.
No. 338,175. Patented Mar. 16, 1886.
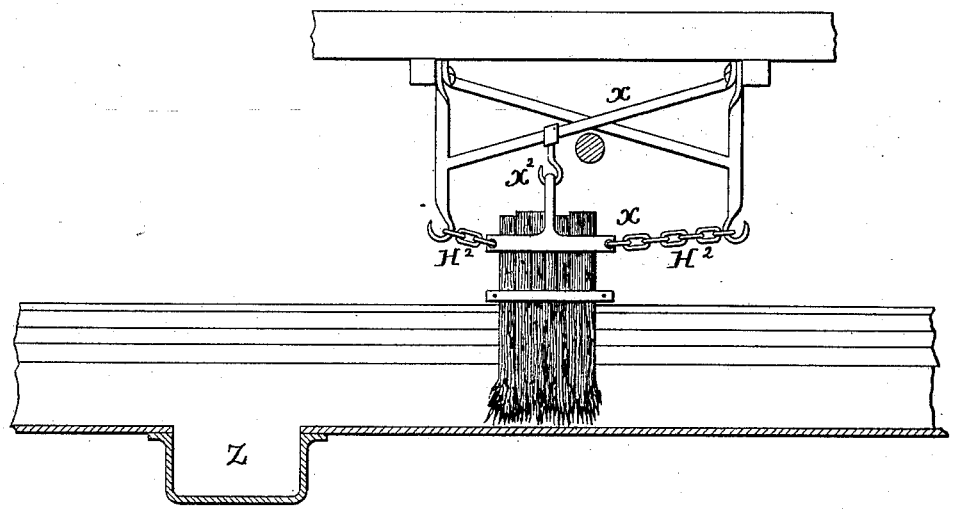
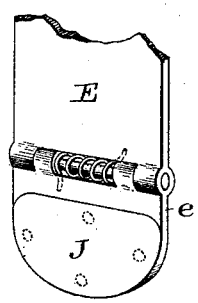
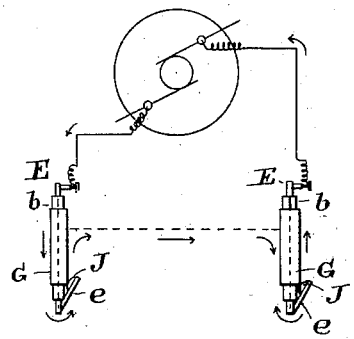
ATTEST-
J. Henry Kaiser
Harry L. Amer
INVENTOR
W. H. Knight
by Bradley & Knight
Attys
N. PETERS, Photo-Lithographer, Washington, D. C.

UNITED STATES PATENT OFFICE.

WALTER H. KNIGHT, OF NEW YORK, N. Y.

ELECTRIC RAILWAY.

SPECIFICATION forming part of Letters Patent No. 338,175, dated March 16, 1886.

Original application filed May 1, 1885. Serial No. 165,102. Divided and this application filed January 18, 1886. Serial No. 189,007.
(No model.)

*To all whom it may concern:*

Be it known that I, WALTER H. KNIGHT, a citizen of the United States, residing at New York city, State of New York, have invented certain new and useful Improvements in Electric Railways, of which the following is a specification, this application being a division of my application No. 165,102, filed May 1, 1885.

My invention relates to that class of electric railways wherein the main conductors are inclosed in a conduit beneath the surface of the roadway and kept in electrical connection with the electric motor on the locomotive by means of two depending conductors, which extend through a slot in the conduit and terminate in contact devices which have a traveling connection with the said main conductors.

It consists in various details of construction of the depending plow carrying the contact-conductors and its connection with the locomotive, and it also consists in a conduit-cleaning device that is attached to the locomotive, and in certain features of the conduit.

Figure I is an end view of a car or locomotive with road-bed or conduit in section. Fig. I$^a$ is a side elevation of the plow in position. Fig. II is a section of the plow on the line 2 2, Fig. I, and shows also a section of the conduit at right angles to its longitudinal direction. Fig. III shows the point of attachment of the plow-support to the locomotive. Fig. IV is a side view of the plows when thrown out of the slot by an obstruction in the conduit or the derailment of the locomotive. Fig. V is a cross-section of the conduit with the broom for cleaning it. Fig. VI is a side view of the broom. Fig. VII shows modified forms of shoes or brushes for making contact. Fig. VIII shows the spring-hinge between the foot and cover. Fig. IX is a diagram of short-circuit connections.

In the drawings, C represents the slotted conduit, having the main conductors A A', supported on insulating-pins from its sides. These conductors have bare contact-faces, against which a contact device—as a shoe or brush—connected with the locomotive constantly presses.

L represents the axle of an electric locomotive, and M one of the wheels on the track T. This locomotive is intended to be propelled by an electric motor connected to the wheels in a well-known manner, the motor being in constant electrical connection with the stationary conductors in the conduit by means of the plows and other devices, to be hereinafter described and claimed. The axle L terminates, as usual, in a journal which turns in box N, between which and the body of the car is the spring V.

To obtain a steady movement of the depending plows, I suspend them from the boxes N by a framing in the following manner: To the box N, I fasten a rod, O, which extends first forward to the edge of the wheel, and then transversely across the car to the box on the opposite end of the axle, which is a counterpart to the one shown at N. A second cross-bar, O', is fastened to the tie-rod O$^2$, that extends between the forward and hinder boxes on the same side of the car. To the middle points of these bars O O', respectively, are fixed the uprights Q Q', having slots at their upper ends and supporting between them the bar R, whose vertical height can be readily adjusted by means of the slots and bolts by means of which it is connected to Q and Q'. Any other adjustable connection may be used, or the adjustment introduced at any other point, its object being to raise or lower the contact parts relatively to the fixed conductors A A'.

The bar R is bent into the shape of a W to accommodate the axle L, which passes beneath it. From the two lower extremities of the W are suspended, respectively, the two plows P P'. Each of these plows consists, first, of the core E, which is preferably a flat strip of steel, and which carries at its upper end a binding-post, K, and at its lower end a foot-piece, e, connected to it by a spring-hinge, (shown in detail in Fig. VIII,) and having screwed to it the removable contact-shoe I. The tendency of the spring-hinge is to throw e up into a position parallel, or nearly so, with E, but in operation it is bent down and the lower end caught under the lower edge of A or A'. It will be seen that the part e and shoe J have constantly a tendency to rotate about the axis of the hinge, which is parallel with longitudinal conductors A and A', but that this tendency is interrupted by J coming in contact with the conductor. This tendency will be maintained, whatever the position of the axis, so that E can have a wide range of vertical play without affecting the contact of the shoe and the conductor. The various positions the shoe may assume are shown in the full and dotted lines of Fig. II. The core E being the carrier of the main current is carefully insulated by the sheath $b$, which is preferably made of vulcanized fiber, rendered water-proof by being soaked in oil, paraffine, or like material. On one side the sheathing $b$ projects down behind the core, as at $b'$, forming a protection against accidental contact of E or $e$ with the opposite conductor. The core E is slipped into the sheath $b$, and the whole then slipped into a guard, G, of chilled cast-iron, which completely surrounds it, transverse pins $p\ p$, of insulating material, being driven through holes left in the material for that purpose. Whenever guard G becomes worn by friction against the edge of the slot, it is easily renewed by driving out pins $p\ p$, when it may be turned end for end, so that the wear will come in a different place, or renewed entirely. These guards, being made as independent castings of chilled iron, are cheap, easily replaced, and will wear longer than any other substance.

The principle of a movable or wearing piece that protects the insulation and can be readily replaced independently of the insulated core and the supporting parts can be carried out in various ways, the one I have shown being the one at present deemed the best. Around the guard G is placed a clamp, F, held by screws at $d\ d$, and provided with an upright, $f$, which terminates in a hook that catches into an eye or hole in R. This permits a longitudinal swing of the plow about a transverse axis, and allows the plow to come out of the slot readily in case of accident, as will be hereinafter described.

On each side of each plow is a lug, $m$, on which is pivoted one end of the clevis $g$, which is of a sufficient width to embrace the plow. The two clevises of the two plows are linked together at $l$, forming a joint between them having a transverse horizontal axis. The two plows thus connected are held tightly before and behind by flexible draw-chains H H', which are connected to some fixed part of the locomotive, and which may be replaced by any flexible connection rod or bar. The chains are attached to the plow at a point just above the slot, which gives it a great mechanical advantage in drawing the plow. This chain is made comparatively weak, so that when any obstacle is encountered by the plow or by the shoe it will break, and the plows will be thrown out of the slot without injury in a manner that will be now described. Just within the lips of the slot, which are formed by the steel rails K K, are the two wooden rails J J, bolted to K K, and forming an insulating guard or lining.

When it is necessary to insert a plow in the slot, the shoe and foot $e$ are bent down until $e$ and E are in line with each other, when it is slipped into the slot, the shoe being thinner than the width of the slot. The breadth of the shoe is somewhat greater than the distance from wooden guard I to conductor A', so that in entering the shoe first springs out against I, and then slides off until it comes in contact with the face of A', and finally comes around under A' to its normal position. When the shoe is in its normal position, only a very severe accident—such as derailment or complete obstruction of the slot or conduit—can interrupt the contact between it and the conductor. In the case of obstruction the draw-chain breaks, as above described, and then both plows turn on axis S S', forming, with their connecting clevises, a parallel link movement, as shown in Fig. IV. The shoes leave the conductors and strike the insulating-guards I, so that any arc that may be formed between either shoe and its conductor is not carried over to the iron of the conduit. When the shoes are out of the slot, they are instantly folded up under the force of the spring-joint against the guards G, as shown in Fig. IV. It is to be remembered that such shoe is in electrical connection with one terminal of the motor, the circuit being completed during normal operation from one conductor, as A', to the shoe, to core E, to binding-post $k$, and from thence through the motor to the other plow, and thence to the other conductor. Both guards G are connected to the metal of the car, so that when shoes J come in contact with them the circuit is completed, as shown in diagram, Fig. IX, between the terminals of the motor, which being driven by the momentum of the car acts as a generator, and, working through a circuit of low resistance, a powerful brake is instantly given to the momentum of the car by consumption of its energy in working the generator.

Whenever the locomotive is derailed, the plows are pulled out of the slot without breakage of the chain. After the plows are out of the slot they ride along on the corner of guard G, and no injury is done to the core or joint.

It will be seen that this arrangement of plows will work equally well in whichever direction the vehicle may be proceeding, as the plows can swing about their transverse axis in either direction with equal facility.

An equivalent to shoe J and foot $e$ is shown in Fig. VII, J' representing a brush, instead of a shoe, and J² representing a shoe fixed directly onto a prolongation of E.

As the slotted conduit in which conductors A A' are placed is set under the surface of the street, it is liable to become filled with an accumulation of dust and dirt in summer and snow in winter. To prevent this, I provide pits at intervals along the bottom of the conduit and opening into it, and on the car I fix a broom, which is adapted to travel along in the conduit and sweep the accumulations into the pits. I make this broom of insulating material in order that there may be no loss of current by the broom short-circuiting the motor from one conductor to the other. It is made, also, with a flat shank, so that it can be drawn through the slot, and yet the lower part can be spread out to cover the floor of the conduit. It must also be capable of being withdrawn from the conduit in case of accident. The broom I have found to best fulfill these conditions is a splint broom made by splitting up one end of a board of green hickory or like wood. A broom of this kind I fix in a clamp, X, which is pivoted to the locomotive like one of the plows P, heretofore described.

In Fig. VI, $x$ is a depending brace. $x^2$ is a hook-and-eye joint, like S, Fig. I, and $H^2$ are draw-chains.

The operations of this broom in cases of emergency are exactly like those of the plows, it being readily thrown out of the slot by the breakage of the chains or derailment of the locomotive.

I desire it to be distinctly understood that in this patent I lay no claim to a plow with a lateral movement about a longitudinal axis or about any but a transverse axis, substantially as described, a plow with other movements relative to the vehicle being shown and claimed in an application of mine now pending in the Patent Office, and such movements being unessential to the operation of the plow described and claimed herein.

I claim—

1. The combination, with a railway-track, of a slotted conduit having an electric conductor therein at a fixed height relative to said railway, a vehicle traveling thereon having springs between its journal-boxes and its body, and a conductor supported from said journal-boxes extending into said slotted conduit, to make a traveling connection with the conductor inclosed therein, and connected at its upper end with an electric motor arranged to propel the said vehicle.

2. The combination, with the track of an electric railway, of an electric supply-conductor extending along said track at a fixed height relative thereto, a vehicle having springs between its journal-boxes and its body, and an electric conductor supported from said journal-boxes, terminating in a contact device and extending to said conductor, to make a constant electrical connection therewith.

3. The combination, in an electric railway, of an inclosed supply-conductor at a constant height relative to the track of the railway, an electrically-propelled vehicle having springs between its body and its axle, and a frame supported from journal-boxes on said axle and carrying a contact device adapted to maintain the electrical connection between the supply-conductor and the propelling motor.

4. The combination, with a journal-box of an electrically-propelled vehicle, of a car-body supported thereby through an intermediate spring, and a contact device also supported by the said journal-box, and adapted to maintain the electrical connection between a stationary supply-conductor and the propelling electric motor.

5. The combination of core E, contact J, movable relatively to said core about a longitudinal axis and supported thereby, and a spring actuating said contact about said axis.

6. The combination, with the insulated core and supporting devices, of a removable reversible guard.

7. The combination, with the conducting-core of the plow, of the insulating-sheath, a metallic guard and transverse pins of insulating material.

8. The combination, with the plow, having a vertical connection with the locomotive, of a draw chain or bar extending from the plow to a fixed point of the locomotive.

9. The combination, with an electrically-propelled vehicle, of a conduit inclosing a supply-conductor and two contact-plows supported from said vehicle and extending into the conduit, one upon each side of an axle of the vehicle.

10. The combination, with an electric locomotive, of a slotted conduit inclosing means for conducting a supply of electricity and two connection-plows extending from said locomotive into said conduit, the two being in line with each other and connected together with an intermediate joint, substantially as described.

11. The combination of two connection-plows extending into a slotted conduit and connected together with a common draw chain or bar.

12. The combination of the two plows, connected together, and each hung so as to swing about a transverse axis, and the two draw-chains connected to their outer extremities.

13. The combination, with a railway and an electric locomotive thereon, of a fixed longitudinal conductor extending along said railway and inclosed in a conduit, and a depending conductor extending from the locomotive into contact with the said fixed conductor, but movable vertically independently thereof, and provided with means outside of the conduit for vertically adjusting its height relatively to said fixed conductor, consisting of a variable connection and stop.

14. The combination, with a stationary longitudinal conductor and a depending connection-conductor movable about a transverse axis, of a chain or stop in the path of its movement about said axis, made weaker than the conductor itself, so as to permit of its breaking when an obstruction is encountered.

15. The combination, with metallic top pieces forming the edge of the slot and contact-conductors removable therethrough, of an insulating lining for said top pieces.

16. The combination, with slot iron K, of a removable contact-conductor and insulating guard or lining, I.

17. The combination, with a slotted conduit, of an insulated conductor therein having a bare contact-surface and a contact-shoe broader than the distance between said conductor and the edge of the conduit.

18. The combination, with the top piece forming the edge of the slot, of conductor A' and foot $e$ with shoe J.

19. The combination, with an electric locomotive, of a stationary conductor in electric connection with the propelling motor, two terminal conductors from said motor, a short-circuiting conductor in a position to be placed in connection with said terminals, and an automatic device actuated by the rupture of the connection between the motor and stationary conductor, for establishing a connection between the two terminals and the short-circuiting conductor.

20. The combination, with insulated core E, of a wearing-guard removable therefrom and independent of the support.

21. The combination, with an electric locomotive, of a slotted conduit beneath the surface of the street or roadway, an insulated electric conductor therein carrying the supply of electricity, a constant electric connection between the locomotive and said conductor, and a broom carried by said locomotive and extending into said conduit through the slot to a point below the said conductor.

22. The combination, with an electric locomotive, of a slotted conduit and an insulated electric conductor therein carrying the main current supply, and with which the locomotive has a constant connection, and a broom having a flat shank, carried by the locomotive and extending into said conduit through the slot.

23. The combination, with an electric locomotive, of a slotted conduit and an insulated electric conductor therein carrying the current supply, and with which the locomotive has a constant connection, and a broom of insulating material carried by the locomotive and extending into said conduit through the slot.

24. The combination, with an electric locomotive, of a slotted conduit having catch-pits at intervals, an insulated electric conductor therein having a bare contact-surface, and a broom carried by the locomotive and extending into the conduit through the slot.

25. The combination, with an electric locomotive, of a slotted conduit, an insulated electric conductor therein having a bare contact-surface, and a splint broom, substantially as described, carried by the locomotive and extending into the conduit.

26. The combination, with a vehicle, of a slotted conduit beneath it, an insulated electric conductor therein having a bare contact-surface, catch-pits at intervals along the conduit, and a cleaning device of insulating material carried by said vehicle, and provided with a flattened shank and extending into said conduit through the slot to a point below the said conductor.

27. The combination, with a slotted conduit, of an insulated conductor therein having a bare contact-surface, catch-pits at intervals along said conduit, and a broom or cleaning device of insulating material, reaching substantially to the bottom of said conduit, for cleaning the same, and having a shank extending upward through the slot for propelling the broom longitudinally.

28. The combination, with an electric locomotive and a slotted conduit inclosing an electric conductor with bare contact-surface, of a broom or cleaning device carried by the locomotive and extending into the conduit, being removable therefrom through the slot.

29. The combination, with an electric locomotive and a slotted conduit, of a broom or cleaning device depending from the locomotive into the conduit, being removable therefrom through the slot and hung on a transverse axis.

30. The combination, with an electric locomotive and a slotted conduit containing the stationary supply-conductor, of a cleaning device carried by the locomotive and a support for the same having a transverse movement relative to the locomotive.

31. The combination, with a vehicle adapted to travel on a street or roadway, having a slotted conduit, of a cleaning device for said conduit connected to said vehicle and longer than the distance from its point of connection with said vehicle to the surface of the conduit, so as to extend into it and expanded transversely within the conduit.

32. The combination, in an electric railway having a slotted conduit containing an insulated conductor for the current of the railway, of a cleaning device for said conduit and a vehicle outside of the conduit connected therewith, the said device being longer than the distance from its point of connection with the vehicle to the surface of the conduit, so as to extend within it, and having a contracted shank adapted to travel along the slot.

33. In an electric railway having its insulated supply-conductor inclosed in a conduit, the combination, with an electric locomotive on said railway, of a cleaning device for said conduit carried thereby, the said device being adapted to extend from the locomotive into the conduit through the slot to a point below the conductor.

34. A cleaning device for the conduit of an electric railway, adapted to be propelled along said conduit and having an insulating-surface at the points adjacent to the electric conductor within the conduit.

35. The combination of the stationary insulated conductor, an electric locomotive, and an intermediate contact-conductor insulated with waterproofed vulcanized fiber.

36. The combination of the stationary insulated supply-conductor, an inclosing-conduit, an electric locomotive, and an intermediate contact-conductor extending through the slot of the conduit and insulated with water-proofed vulcanized fiber.

37. The combination, with a slotted conduit inclosing an electric supply-conductor, of a contact-plow extending through the slot of the conduit and consisting of a conductor for the current, insulation of water-proofed vulcanized fiber, and means for protecting the latter against wear from the edges of the slot.

38. The combination, with an electric conductor extending from an electric locomotive to an inclosed supply-conductor, of an insulation of vulcanized fiber treated with paraffine, oil, or like waterproofing substance.

WALTER H. KNIGHT.

Witnesses:
WILLIS FOWLER,
CHAS. H. LUTHER, Jr.